United States Patent

[11] 3,575,012

[72] Inventor David G. Peckham
 La Crosse, Wis.
[21] Appl. No. 773,844
[22] Filed Nov. 6, 1968
[45] Patented Apr. 13, 1971
[73] Assignee The Trane Company
 La Crosse, Wis.

[54] ABSORPTION REFRIGERATION SYSTEM HAVING TWO STAGE GENERATOR
 7 Claims, 2 Drawing Figs.
[52] U.S. Cl. .................................................. 62/476,
 62/497
[51] Int. Cl. .............................................. F25b 15/06
[50] Field of Search............................................ 62/141,
 476, 497, 489, 101

[56] References Cited
UNITED STATES PATENTS
| | | | |
|---|---|---|---|
| 2,983,117 | 5/1961 | Edberg et al.................. | 62/476 |
| 3,137,144 | 6/1964 | Kaufman et al.............. | 62/141 |
| 3,426,547 | 2/1969 | Foster .......................... | 62/101 |

Primary Examiner—Martin P. Schwadron
Assistant Examiner—P. D. Ferguson
Attorneys—Lee E. Johnson and Arthur O. Andersen ABSTRACT: An absorption refrigeration system having a two stage generator, wherein the major components are contained in a single shell and wherein the refrigerant is released from the absorbent solution in two generating steps and steam substantially above atmospheric pressure is supplied to the first stage generator and the condensate therefrom is put in heat exchange with the absorbent in the second stage generator.

Patented April 13, 1971

*INVENTOR.*
DAVID G. PECKHAM

BY Arthur O. Andersen
ATTORNEY

ABSORPTION REFRIGERATION SYSTEM HAVING TWO STAGE GENERATOR

It is an object of the invention to provide absorption refrigeration system which is more efficient in the use of heat supplied thereto.

It is another object to provide a two stage absorption system in a single shell in such a manner that a compact and efficient system is obtained.

It is another object to provide an absorption system which varies its output according to the load imposed on the system.

Other objects and advantages of the invention will become apparent as the specification proceeds to describe the invention with reference to the accompanying drawings in which.

Figure 1:
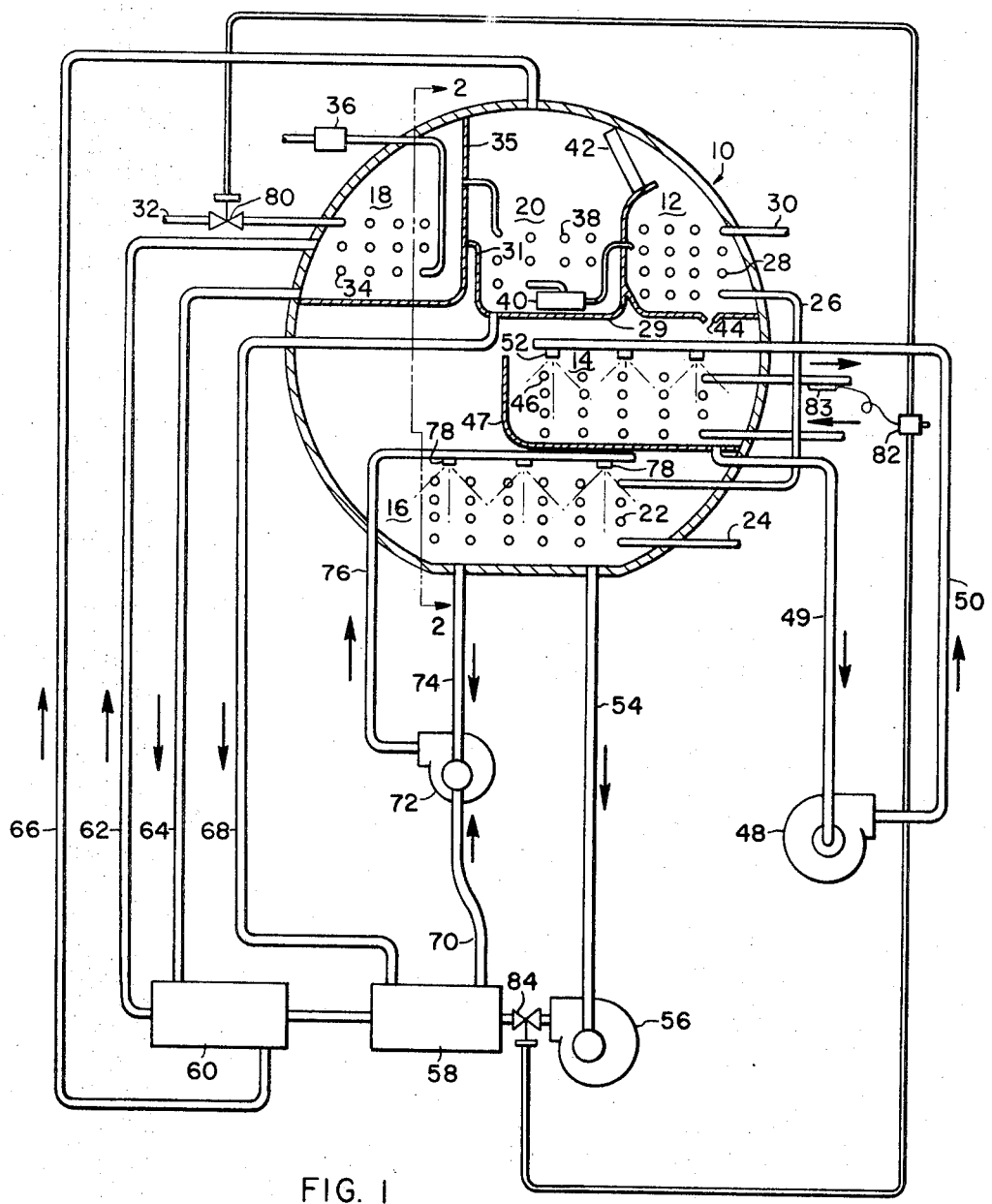
FIG. 1 is a transverse partially diagrammatic sectional view of the two stage absorption refrigeration system of my invention.
Figure 2:
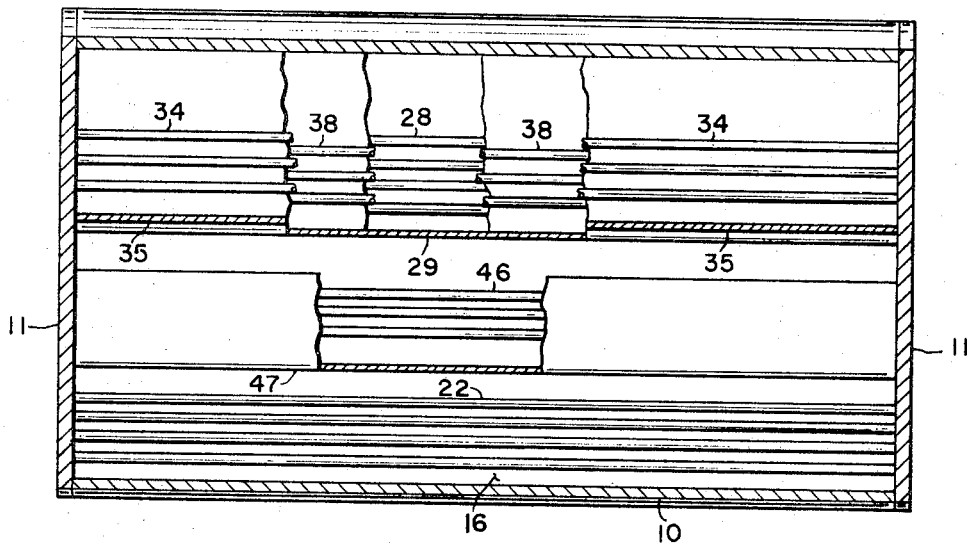
FIG. 2 is a longitudinal sectional view of the system taken substantially on the line 2–2 of FIG. 1 and having parts broken away to show the interior construction.

In the drawings there is shown an absorption refrigeration system comprising a fluidtight shell 10 enclosing a condenser 12, an evaporator 14, an absorber 16, a first stage high-pressure generator 18 and a second stage low-pressure generator 20.

The shell 10 has tube sheets 11 at its ends which are in fluid communication with headers for conducting fluids to and from the heat exchangers in the shell as is common in the art.

The absorber 16 has a heat exchanger 22 supplied with cooling fluid from a source 24 to remove heat from the absorber 16. Source 24 may be water which is evaporatively cooled by air. This cooling fluid is conducted by a conduit 26 to a heat exchanger 28 in the condenser 12. The heat exchanger 28 comprises a plurality of longitudinally extending tubes. The cooling fluid leaves the condenser through a conduit 30.

A wall 29 is secured to the sides of the shell 10 and to the tube sheets 11 to separate the interior of the shell 10 into two chambers. One chamber includes the evaporator 14 and the absorber 16 which are relatively low in pressure. The second chamber contains a first stage high-pressure generator 18, a second low-pressure generator 20 and a condenser 12, all of which have greater operating pressures than the evaporator 14 and the absorber 16.

High-pressure steam flows from a source 32 such as boiler to a heat exchanger 34 in the first stage generator 18 which is separated from the second stage generator by a wall 35. Heat exchanger 34 comprises a plurality of longitudinally extending tubes.

A trap 36 may be provided to pass condensate and substantially no steam from heat exchanger 34 back to the source 32.

Heat from the heat exchanger 34 causes the solution in the first stage generator to boil.

Various types of refrigerant and absorbent may be used in the present machine. A solution of lithium bromide as an absorbent and water as a refrigerant is satisfactory. Other absorbents and refrigerants may be used if desired.

The term "concentrated solution" as used herein means a solution which is concentrated in absorbent.

The refrigerant vapor generated in the first stage generator 18 flows through a heat exchanger 38 in the second stage generator 20. Heat exchanger 38 comprises a plurality of longitudinally extending tubes. A flow regulating device 40 in the form of an orifice or trap regulates the flow of refrigerant from the heat exchanger 38 to the condenser 12. The heat from heat exchanger 38 causes the solution in the second stage generator and the vapor passes through a liquid eliminator 42 to the condenser 12 in which the refrigerant vapor is condensed to a liquid which flows through an opening 44 to the evaporator 14. The wall 31 of the second stage generator is spaced from the lower portion of the wall 35 of the first stage generator 18. The space between these walls contains refrigerant vapor and therefore the transmission of heat from the first stage generator 18 to the second stage generator 20 is effectively reduced to provide efficient operation.

Absorbent solution in the absorber 16 absorbs refrigerant vapor from the evaporator 14 thus removing latent heat from the heat exchanger 46 in which fluid from a heat load is circulated to a heat load. Heat exchanger 46 comprises a plurality of longitudinally extending tubes. Refrigerant liquid which drips from the heat exchanger 46 is collected by a pan 47 from which it flows through a conduit 49 to a pump 48 which delivers the refrigerant liquid through conduit 50 to be sprayed in the evaporator 14 through nozzles 52.

Solution from the absorber 16 flows through conduit 54, through pump 56, through low temperature heat exchanger 58, through high temperature heat exchanger 60, and through conduit 62 to first stage generator 18 in which it is partially concentrated.

The partially concentrated solution flows through conduit 64 from first stage generator 18 to high temperature heat exchanger 60 and thence through conduit 66 to second stage generator 20 in which it is further concentrated. The concentrated solution from the second stage generator 20 flows through conduit 68 to low temperature heat exchanger and then through conduit 70 to pump 72. Dilute solution flows from absorber 16 through conduit 74 to pump 72 to mix with solution flowing from conduit 70 to pump 72. The solutions from conduits 70 and 74 mix at the entrance to the pump and in the pump 72. The mixed solution flows from pump 72 through conduit 76 and is discharged through nozzles 78 into the absorber 16.

CONTROL

To vary the cooling capacity of the machine a steam control valve 80 which may be of the pneumatic-type controls the flow of steam to the heat exchanger 34 in the first stage generator. A pneumatic thermostat 82 has a sensing bulb 83 in temperature sensing relationship with the temperature of the chilled water leaving the evaporator 14. The chilled water leaving the evaporator has been cooled in the evaporator and is substantially at the same temperature. The thermostat 82 is connected to the valve 80 to open the valve on an increase of temperature as measured by the thermostat 82 and to close the valve 80 on a decrease in temperature of the evaporator. The thermostat 82 is connected to a source of pneumatic pressure.

To improve the efficiency of the machine as the load is reduced, a solution flow valve 84 is provided in the conduit from the discharge of pump 56 to the heat exchanger 58. Valve 84 may be of the pneumatic type and it is connected to receive a pneumatic pressure signal from the thermostat 82. As the temperature of the chilled water adjacent bulb 83 tends to decrease the thermostat 82 operates to close valve 84 and circulate less solution through the system. This improves the coefficient of performance of the machine at loads less than maximum.

Although I have described the foregoing preferred embodiment of my invention, I contemplate that many changes may be made without departing from the scope or spirit of my invention and I desire to be limited only by the claims.

I claim:

1. An absorption refrigeration system comprising a unitary sealed horizontal substantially cylindrical elongated container having therein an absorbent and a refrigerant, an elongated partition extending longitudinally of said container and forming with the walls of said container a low-pressure chamber and a high-pressure chamber, an absorber and an evaporator in said low-pressure chamber, a first stage generator in said high-pressure chamber, a second stage generator in said high-pressure chamber, a condenser in said high-pressure chamber, means for heating said first stage generator, means for conducting refrigerant vapor from said first stage generator to said second stage generator to be condensed therein, means for conducting refrigerant vapor and refrigerant condensate from said second stage generator directly to said condenser without admixture prior to entry into said condenser, means for conducting refrigerant liquid from said condenser to said evaporator, first conduit means for conducting absorbent from said first stage generator to said second stage generator, second conduit means for conducting absorbent from said second stage generator to said absorber, and third conduit means for conducting absorbent from said absorber to said first stage generator.

2. An absorption refrigeration system according to claim 1 including flow regulating means in said third conduit, means for regulating the flow in said third conduit means, and means responsive to the temperature of said evaporator for adjusting said flow regulating means.

3. An absorption refrigeration system according to claim 1 wherein the absorber is below the evaporator.

4. An absorption refrigeration system as defined in claim 1 wherein said elongated partition has a salient portion extending between the first stage generator and the second stage generator, said salient portion being constructed and arranged to contain refrigerant vapor to reduce the flow of heat from the first stage generator to the second stage generator.

5. An absorption refrigeration system according to claim 1 wherein the means for conducting the refrigerant received from said first stage generator to said condenser is a heat exchange conduit in said second stage generator.

6. An absorption system according to claim 5 wherein said heat exchange conduit has a flow regulating device substantially at its end which discharges refrigerant to said condenser, said flow regulating device being constructed and arranged to restrict the flow so that the fluid passing said valve is substantially all liquid.

7. An absorption refrigeration system comprising a unitary sealed horizontal substantially cylindrical elongated container having therein an absorbent and a refrigerant, an elongated partition extending longitudinally of said container and forming with the walls of said container a low-pressure chamber and a high-pressure chamber, an absorber and an evaporator in said low-pressure chamber, a first stage generator in said high-pressure chamber, a second stage generator in said high-pressure chamber, a condenser in said high-pressure chamber, said second stage generator being interposed horizontally between and having a common vertical extent with one of said first stage generator and said condenser, means for heating said first stage generator, means for conducting refrigerant vapor from said first stage generator to said second stage generator to be condensed therein, means for conducting refrigerant vapor and refrigerant condensate from said second stage generator to said condenser, means for conducting refrigerant liquid from said condenser to said evaporator, first conduit means for conducting absorbent from said first stage generator to said second stage generator, second conduit means for conducting absorbent from said second stage generator to said absorber, and third conduit means for conducting absorbent from said absorber to said first stage generator.